Oct. 17, 1950  T. F. ESERKALN ET AL  2,526,547
MACHINE TOOL
Filed Dec. 17, 1946  6 Sheets-Sheet 3
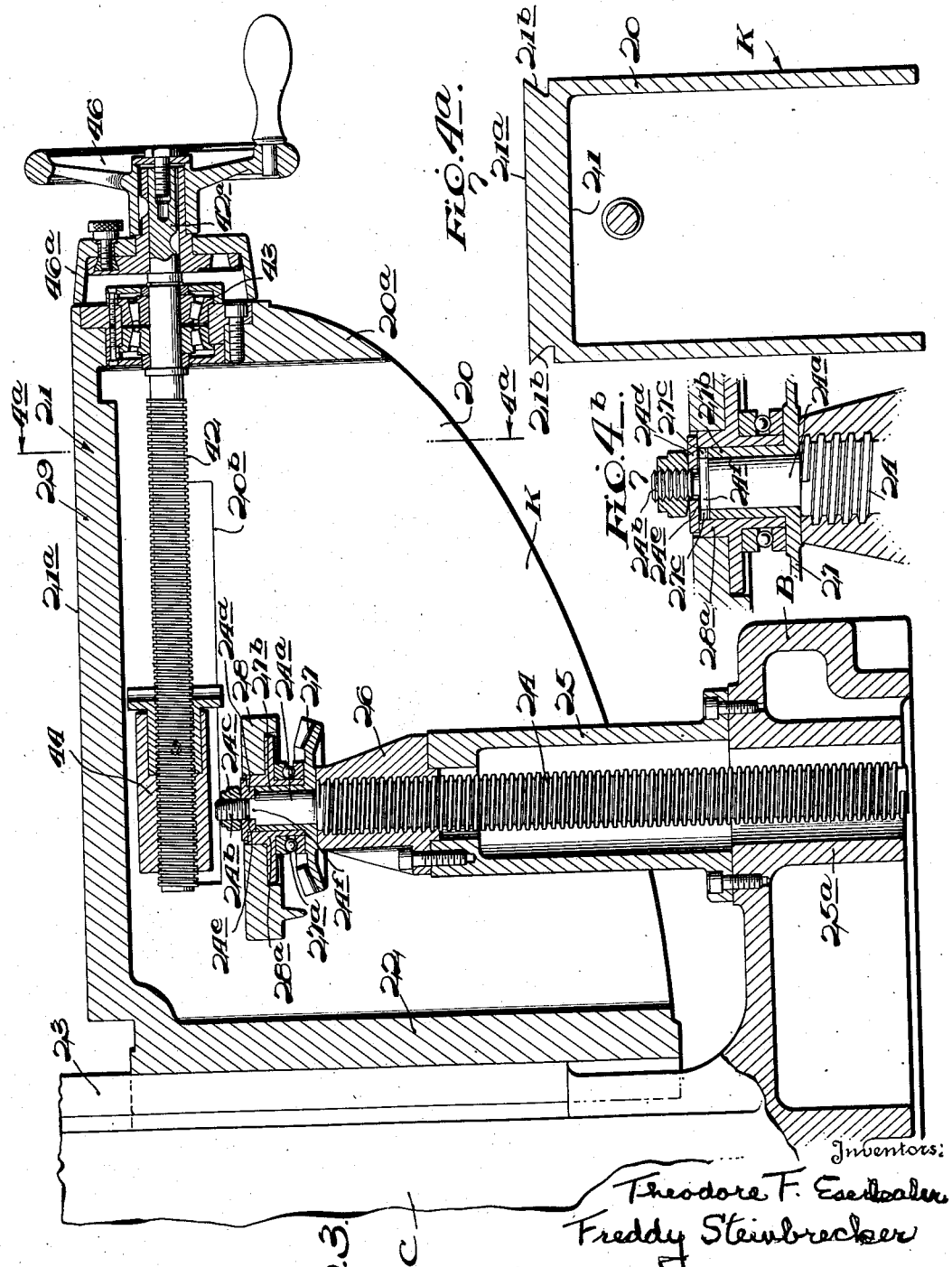

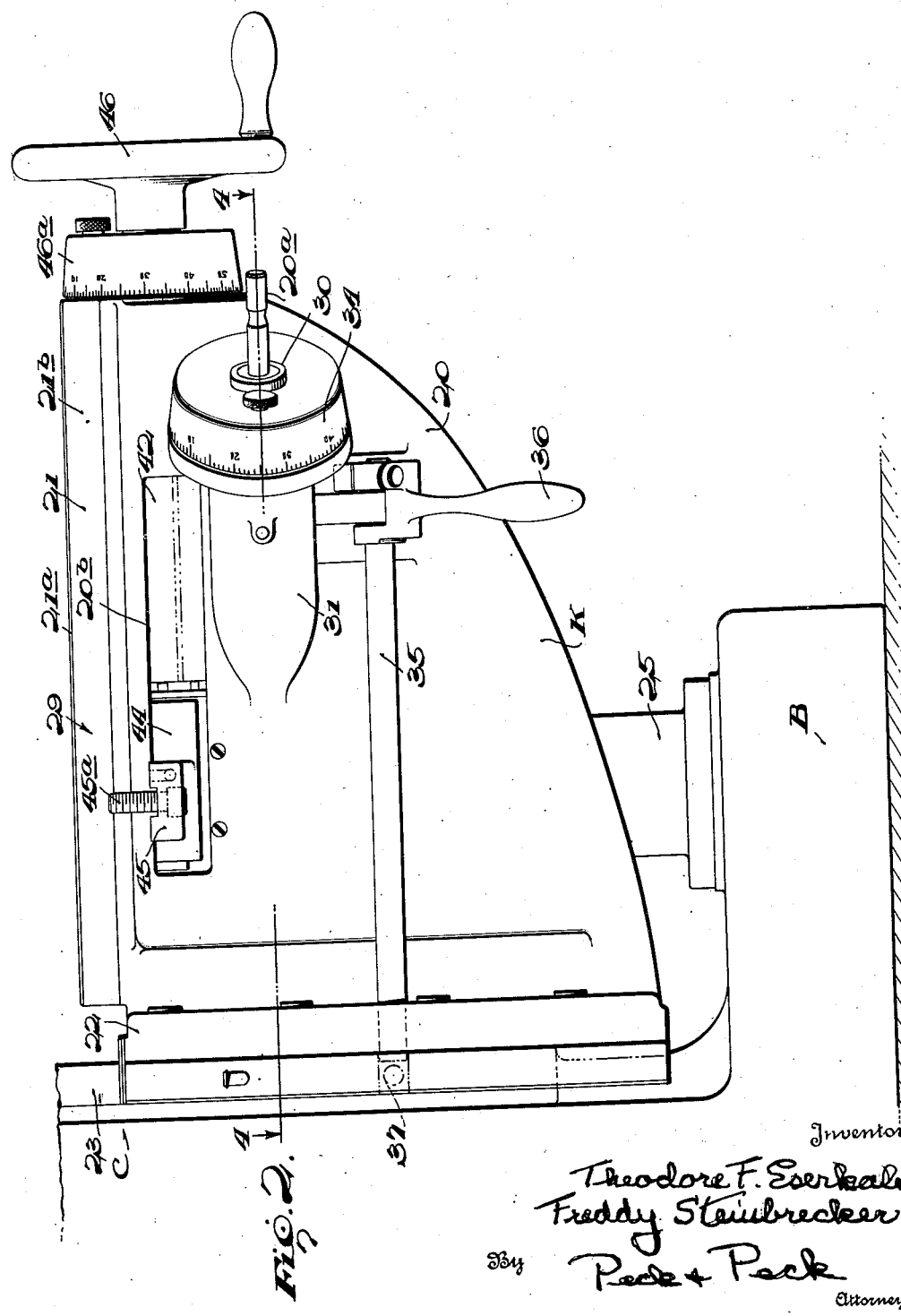

Oct. 17, 1950  T. F. ESERKALN ET AL  2,526,547
MACHINE TOOL
Filed Dec. 17, 1946  6 Sheets-Sheet 4
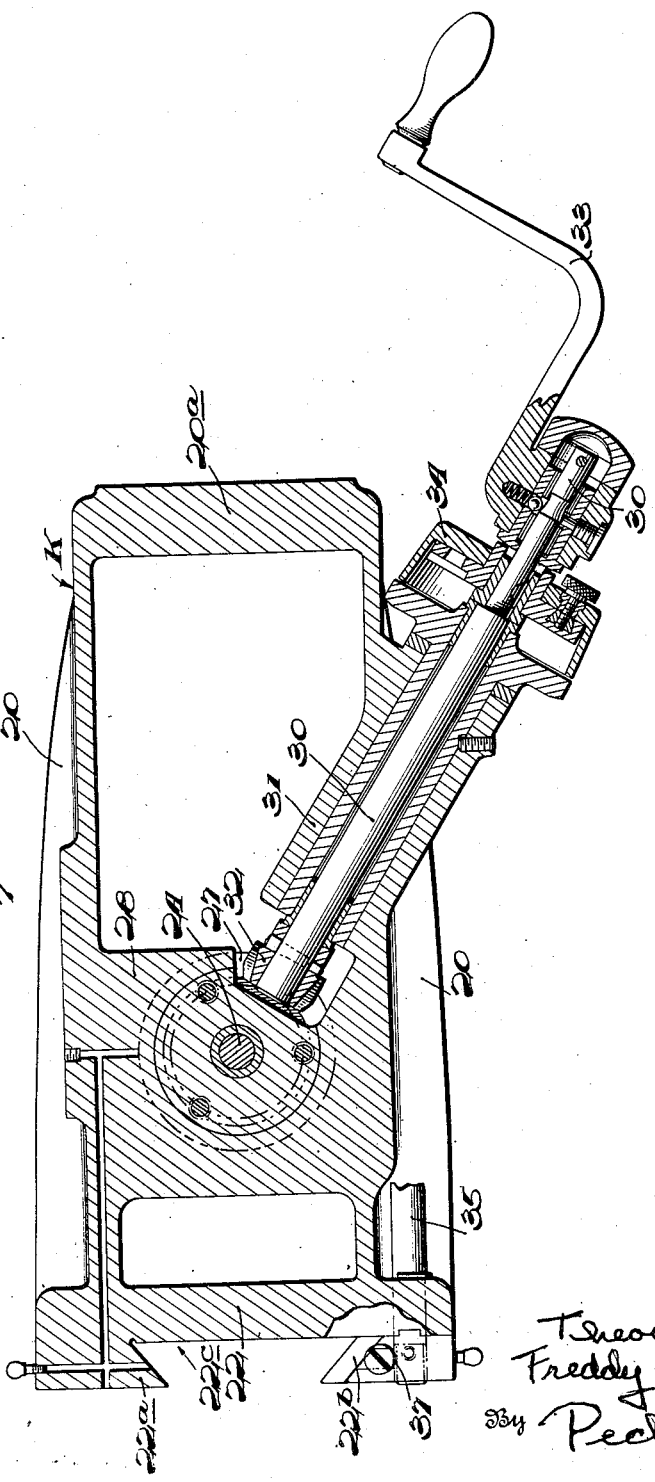
Inventors:
Theodore F. Eserkaln
Freddy Steinbrecker
By Peck + Peck.
Attorneys

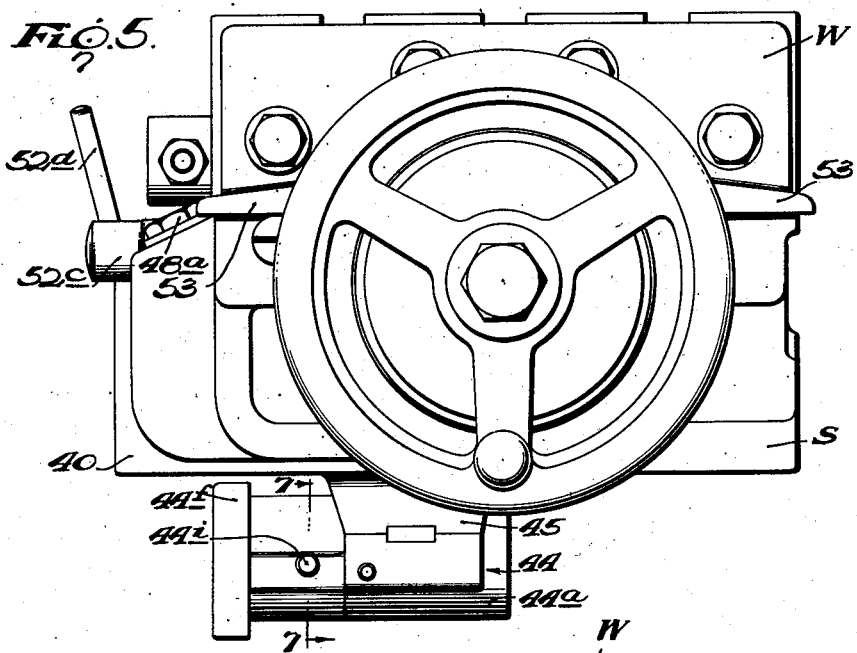
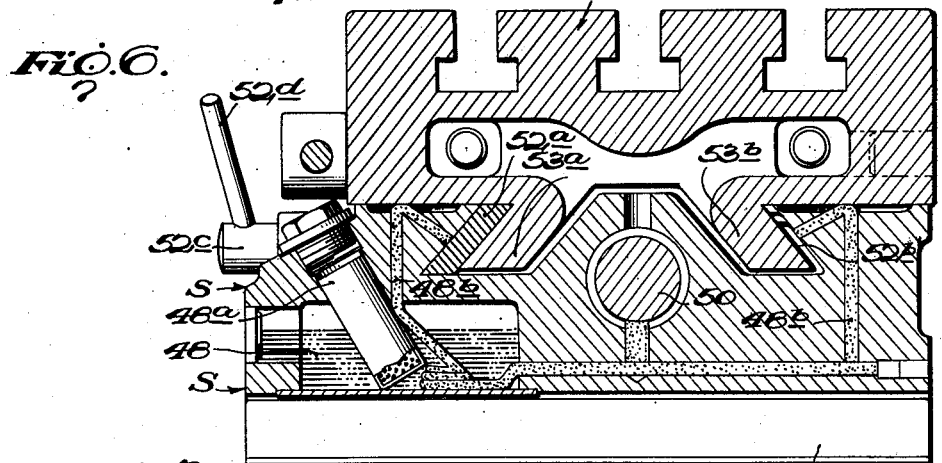
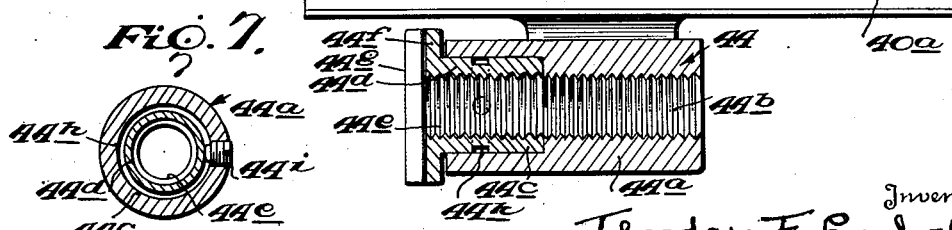

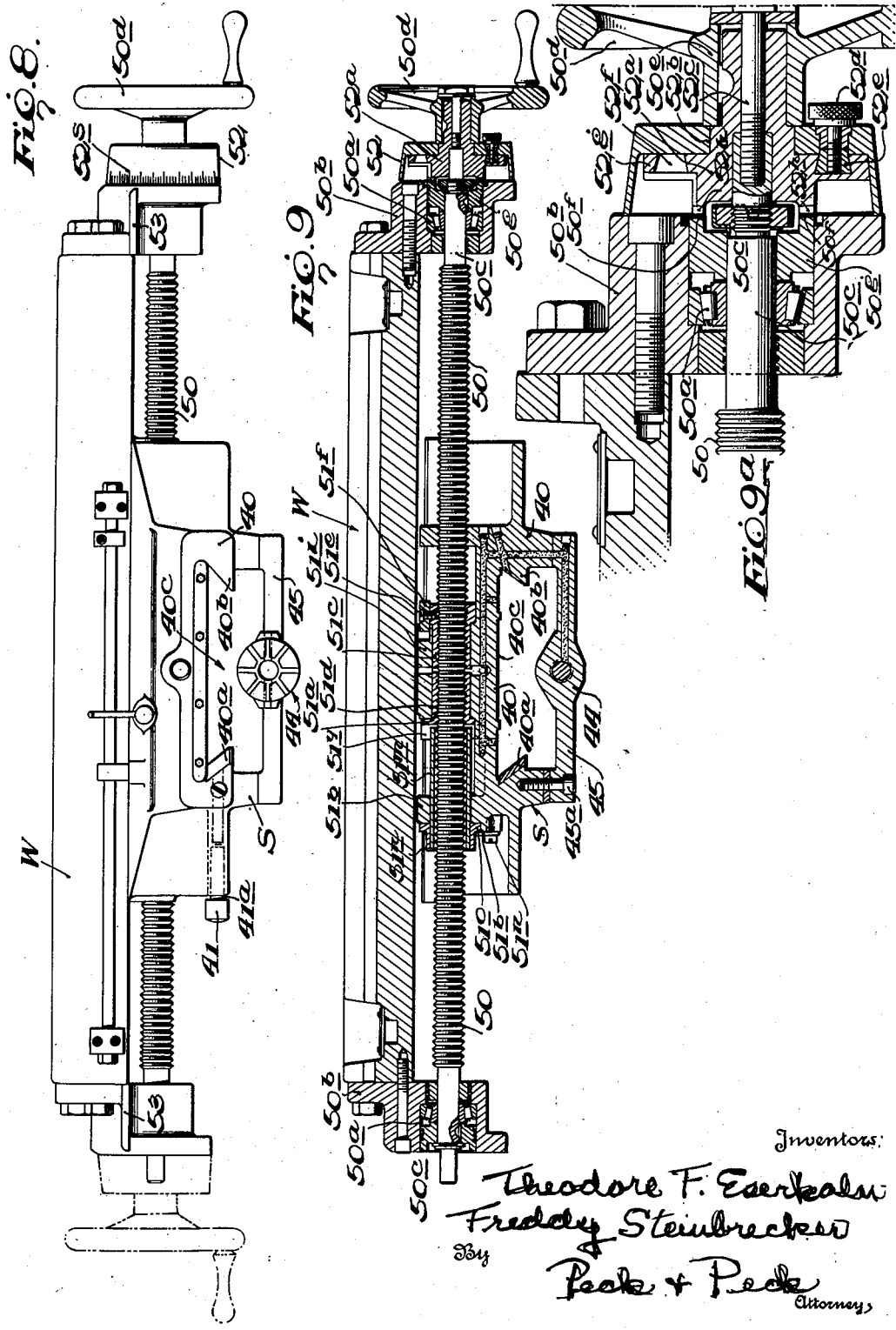

Patented Oct. 17, 1950

2,526,547

UNITED STATES PATENT OFFICE 2,526,547

MACHINE TOOL

Theodore F. Eserkaln, Wauwatosa, and Freddy Steinbrecker, Racine, Wis., assignors to George Gorton Machine Company, Racine, Wis., a corporation of Wisconsin Application December 17, 1946, Serial No. 716,842

2 Claims. (Cl. 90—21)

This invention relates to certain improvements in machine tools and the like; and the nature and objects of the invention will be readily recognized and understood by those skilled in the arts to which the invention relates in the light of the following explanation and detailed description of the accompanying drawings illustrating what we now consider to be the preferred embodiments and mechanical expressions of our invention, from among various other embodiments, adaptations, forms, arrangements and combinations of which the invention and the various features thereof are capable within the broad spirit and scope thereof.

The invention is primarily concerned with machine tools of the so-called vertical milling, routing, die-sinking, profiling and the like types, generally characterized by a vertically disposed column or frame structure at the forward side of which is positioned a suitable work table organization which includes a horizontally and vertically adjustable work table, with a rotary cutter spindle positioned above such work table and mounted for vertical movement toward and from the work table in a cutter head at the forward end of a ram structure mounted on the upper side of the vertical column or frame structure for horizontal adjustment to position the cutter spindle relative to the work table therebelow, and which ram structure carries a spindle drive or transmission including a suitable driving motor all mounted as a unit on and with the rotary cutter spindle carrying ram structure. However, various features of the invention, as will be referred to hereinafter, are not limited to adaptation for and use with these so-called "vertical milling" types of machine tools, such type being illustrated and described herein primarily by way of example and not of limitation, but are applicable generally to various other types and arrangements of machine tools utilizing and embodying a rotary cutter spindle or the like and/or a spindle carrying ram structure and/or an adjustable work table organization.

It is to be understood that the term "milling," as sometimes used hereinafter in this description, is used in a broad generic sense primarily for purposes of convenience of terminology and not by way of limitation, except where given a specific limited meaning by context directly associated therewith. In the broad generic sense with which this term "milling" is used herein, the term includes various types of machine tools which utilize a rotary cutter spindle or the like, whether or not such machines may be specifically intended and designed for milling, routing, die-sinking, profiling or similar or other characters of work.

It is a general object of our invention to improve the over-all accuracy and efficiency of operation of such types of machine tools, and to provide a design and construction for attaining such object which will require a minimum of maintenance in operation and use of the machine and which will be durable and of long life under the conditions of operation and use.

Included among the more specific and particular objects of the invention are the following:

To provide a design, construction and mounting of a work table carrying knee and saddle of a work table organization by which the knee is so constructed as to provide a solid unbroken top wall presenting a flat upper surface, so that the work table carrying saddle may be slidably adjustably mounted thereon and be rigidly clamped in adjusted positions without lateral deflection or distortion of the knee, and further to provide an arrangement of adjusting mechanism by which the adjusting forces are centrally applied and equally distributed to the knee and saddle.

Further objects of the invention are to improve the construction of various other elements and parts of the general types of machine tools as hereinabove referred to, in order to increase the efficiency of such machines in operation and use.

With the foregoing and certain other objects, features and results in view which will be readily apparent from the following detailed description and explanation, our invention consists in certain novel features in design and construction of parts and elements, and in certain novel combinations and arrangements of parts and elements, all as will be more specifically referred to and fully explained hereinafter.

Referring to the accompanying drawings in which similar reference characters refer to corresponding parts and elements throughout the several figures thereof;

Fig. 2 is a view in side elevation of the vertically adjustable knee and its mounting on the base and column of the machine of Fig. 1, with the work table supporting saddle and work table removed therefrom to show the adjustable feed nut and lead screw of the saddle actuating mechanism.

Fig. 3 is a view in vertical longitudinal section through the knee of Fig. 2, showing the lead screw of the actuating mechanism for vertically adjusting the knee, and the lead screw with its operating hand wheel and nut of the saddle actuating mechanism.

Fig. 4 is a horizontal section taken through the knee and its actuating mechanism, taken as on the line 4—4 of Fig. 2.

Fig. 4a is a vertical, transverse section through the knee, taken as on the line 4a—4a of Fig. 3.

Fig. 4b is a vertical transverse section taken through the upper end of the knee elevating screw and bevel gear keyed thereon, the section having been taken at ninety degrees (90°) to the section therethrough in Fig. 3.

Fig. 5 is a view in side elevation of the saddle removed from the knee with the work table thereon being shown in end elevation, taken as from the front side of the machine of Fig. 1.

Fig. 6 is a vertical section longitudinally through the saddle and the actuating lead screw nut of the saddle actuating mechanism of Fig. 5 and a transverse section through the work table in mounted position on the saddle.

Fig. 7 is a vertical, transverse section through the adjustable feed nut for the saddle lead screw taken as on the line 7—7 of Fig. 5.

Fig. 8 is a view in elevation of the assembled saddle and work table taken as from the forward side of the machine of Fig. 1, and particularly showing the lead screw and operating hand wheel therefor of the work table actuating mechanism, and the yoke centrally supporting the adjustable nut below the saddle for operative association with the lead screw of the saddle actuating mechanism.

Fig. 9 is a vertical section through the saddle and work table assembly of Fig. 8, taken transversely through the saddle and longitudinally through the work table, and particularly showing the adjustable feed nut mounted on the saddle for operative engagement with the lead screw of the work table actuating mechanism.

Fig. 9a is a vertical section through the removable hand wheel and micrometer dial member unit mounted on the work table motioning lead screw.

Figure 1:
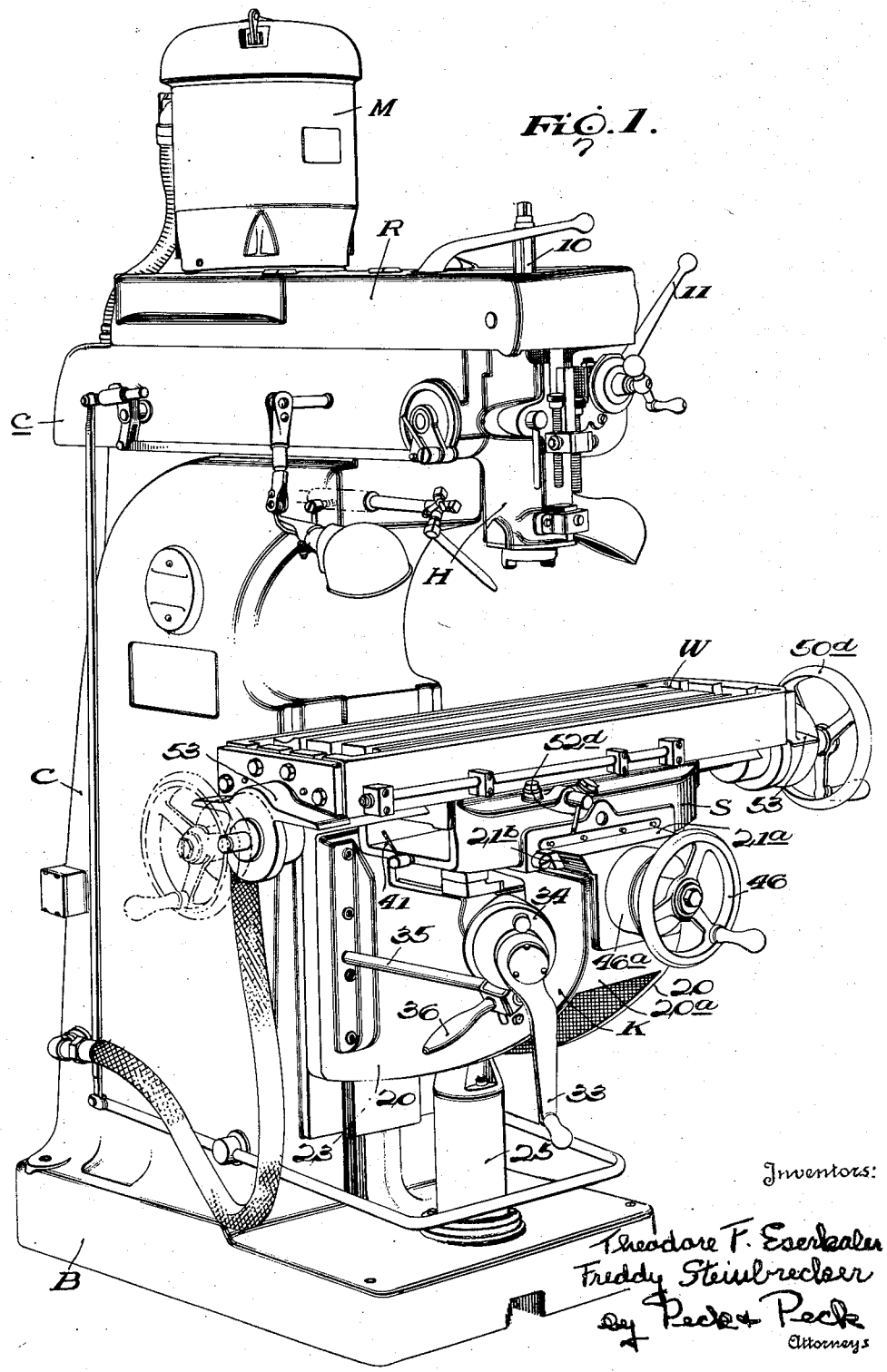
Fig. 1 is a perspective view of a type of vertical milling machine embodying and including the various features and improvements of our invention.

The vertical milling type of machine tool which we have selected and disclosed and described herein by way of example, is illustrated in Fig. 1 of the accompanying drawings, and embodies the various features of our invention as adapted to such type of machine tool. It is to be understood, however, that the invention and the various features thereof are not limited to such particular form of vertical milling machine or to the vertical milling types of machine tools, as our invention and the features thereof are intended for and adapted to application to and use with any type of machine tool or the like, where the advantages and results of our invention may be found useful or desirable.

The vertical milling machine illustrated in Fig. 1 of the drawings, basically includes a vertical support column or frame structure C, supported upon and extending vertically upwardly from the rear portion of a base B. A work table W is mounted and supported in horizontally disposed position for movement in a horizontal plane to laterally adjusted positions, and for vertical movements upwardly or downwardly to vertically adjusted positions, by a suitable adjustable work table supporting organization which includes a vertically adjustable knee K supported from the forward portion of the base B and slidably engaged with the forward side of the column C, and a horizontally adjustable saddle S slidably supported on the upper side of the knee K for horizontal movements along a staight line path longitudinally of the knee K, that is to say, "in" or "out" relative to the machine. The work table W is slidably mounted on the saddle S for horizontal movements in opposite directions along a straight line path transversely of the saddle S and at right angles to the path of "in" and "out" movements of the saddle, that is to say, longitudinally across or to the right or left relative to the machine. The work table W is bodily moved by and with the saddle S on the "in" and "out" movements of the saddle, relative to the machine.

The type of vertical milling machine of Fig. 1 also includes a rotary cutter spindle 10 which is rotatably mounted in vertically disposed position above the work table W, in a cutter head H carried by and depending from a horizontally adjustable ram structure R. The ram R is slidably mounted and supported on a horizontally disposed base structure c formed at the upper end of the vertical column C, for horizontal movements in opposite directions along a straight line path parallel to the straight line path of "in" and "out" movements of the saddle S and table W, for adjusting the position of the spindle 10 above and relative to the work table W. The rotary cutter spindle 10 is mounted in the cutter head H for vertical axial or longitudinal movements toward and from the work table W, a suitable actuating mechanism for effecting such vertical movements of the cutter spindle being provided which includes a manual operating lever 11 located in this instance at the right hand side of the ram mounting sub-base c at the upper end of the column C. The spindle 10 in this example, is driven by and from a motor M which is mounted on and carried as a unit with the ram R. A suitable spindle drive or transmission is provided for placing the motor M in driving connection with spindle 10, as will be referred to and described hereinafter.

Knee, saddle and work table

The knee K, referring now to Figs. 1, 2, 3 and 4 of the drawings in particular, is preferably formed of a hollow casting providing the opposite, vertically disposed, spaced side walls 20, joined and connected at and along the upper sides thereof by the horizontally disposed, solid and unbroken top wall 21 (see Fig. 4a). The top wall 21 provides and presents the horizontal flat upper surface 21a which is precision machined to form a smooth, horizontally true surface. The side walls 20 and the top wall 21 merge into and are joined at the rear sides or ends thereof located adjacent the machine column C, by a vertically disposed end wall 22 provided with the spaced parallel, vertical undercut flanges or guides 22a and 22b which form a vertically disposed dovetail groove 22c therebetween (see Fig. 4). In this instance, the flange or guide 22b is formed as a gib member or bar which is mounted for lateral movements to and from adjusted and clamping positions.

The forward side of the column C is formed or provided with the usual vertically disposed slideway 23 on and over which the guide flanges 22a and 22b of knee 20 are slidably fitted, with this slideway being of dovetail cross-section and fitting and being received in the dovetail groove 22c between the flanges or guides 22a and 22b. Thus, the knee K is slidably mounted and confined on the column C for vertical movements by the flanges or guides 22a and 22b slidably engaged with the opposite vertical sides of the slideway 23.

In this example, the knee K is vertically adjustably supported on and carried by the externally threaded elevating screw 24 (see Fig. 3). The elevating screw 24 is mounted on the base B disposed in vertical position extending upwardly from the base through a vertically disposed tubular housing 25 in axial continuation of a well formed by a vertically disposed annular wall 25a in the base B. The elevating screw 24 is mounted and supported in an internally threaded nut member 26 fixed on and to the upper end of the casing 25 with the external threading of the screw 24 engaged and in mesh with the internal threading of the nut 26. Thus, rotation of the elevating screw 24 in one direction will cause the screw to feed upwardly through the fixed nut 26 while rotation thereof in the opposite direction will cause the screw to feed downwardly through said nut. A reduced diameter upper end extension 24a of the elevating screw 24 mounts a bevel gear 27 which is suitably fixed or keyed thereto for rotating the elevating screw 24.

The knee K is formed with a horizontally disposed, transverse wall or web 28 spaced a distance below the top wall 21 and extending between and bracing the opposite side walls 20 of the knee. The knee K is supported on and coupled to the upper end of the elevating screw 24, by providing a rotatable connection between the upper end of the elevating screw and bevel gear assembly thereon, and the transverse wall 28 within the knee, as will be clear by reference to Fig. 3 of the drawings.

In this instance, the bevel gear 27 is formed with a hub 27b, which extends upwardly therefrom on the reduced diameter portion 24a, at the upper end of the screw 24. This hub 27b is received in a sleeve or tubular bushing member 28a mounted and positioned in a vertical bore which extends upwardly through the transverse wall 28 of the knee K. An annular thrust bearing 27a is mounted on a depending portion of sleeve 28a in position around such sleeve and the hub 27b of gear 27, between the bevel gear and the transverse wall 28 thereabove. The reduced diameter upper end or tip portion 24a of elevating screw 24, extends upwardly through transverse wall 28, and terminates in an externally threaded, reduced diameter end at the upper side of wall 28 onto which a suitable lock nut 24c is threaded to positively connect the elevating screw and bevel gear assembly to the wall 28.

We have provided an arrangement for keying the bevel gear 27 to the elevating screw 24 which will eliminate or reduce lash in rotating the elevating screw by and from bevel gear 27. We have by this keying arrangement also provided an axial lock comprising a minimum of parts. In the example of such a keying arrangement disclosed herein, referring now to Figs. 3 and 4b of the drawings, we provide a disc member 24d mounted and positioned in the upper end of the sleeve or bushing member 28a, by a radial flange of the disc which is seated on the upper end edge of sleeve member 28a. The disc member 24d is provided with a central bore therein through which the externally threaded tip portion 24b of elevating screw 24 extends. The under side of disc member 24d within the sleeve 28a is formed with a transverse slot 24e extending diametrically thereacross (see Fig. 4b). The upper end of the hub 27b of bevel gear 27 is formed with aligned, radially disposed tongues 27c, extending upwardly from diametrically opposite locations on the upper end edge of the sleeve, and the reduced diameter portion 24a of the elevating screw 24 is provided on the upper end thereof with a transverse tongue 24f extending upwardly therefrom and diametrically thereacross with the tip portion 24b extending upwardly from such tongue. The tongues 27c of gear hub 27 and the tongue 27f on the upper end of the reduced diameter portion 24a of screw 24, are aligned and form a composite tongue which extends upwardly into T-slot 24e at the underside of disc member 24d and thus key the bevel gear 27 to the elevating screw 24. The nut 24c is threaded onto tip portion 24b of screw 24 and is tightened down onto the upper side of disc member 24d to secure the gear 27 and screw 24 in position keyed together for rotation without lash, while forming therewith an axial lock between the bevel gear and elevating screw with the latter positively connected with a transverse wall 28 of knee K against axial movement relative to such wall but freely rotatable relative thereto.

In this manner the knee K is supported on the upper end of the elevating screw 24 with the screw rotatably threaded in the fixed nut 26 and the screw and bevel gear assembly rotatable relative to and independently of the wall 28 of the knee. The elevating screw 24 is tied or connected to wall 28 by threaded end 24b and lock nut 24c, so that the elevating screw 24 is positively coupled with wall 28. Rotation of the elevating screw 24 by rotation of the bevel gear 27 will feed the elevating screw upwardly or downwardly in accordance with the direction of rotation of the screw to bodily raise or lower the knee K to vertically adjusted positions, with the knee slidably confined on and accurately positioned by the vertical slideway 23 at the forward side of the supporting column C.

Actuating mechanism is provided for rotating the bevel gear 27 to raise and lower the elevating screw 24. Such mechanism may, as in this example, take the form of an actuating shaft 30 journaled in a horizontally disposed tubular housing or casing 31 extending through a side wall 20 of the knee K at an angle thereto (see Fig. 4), which casing 31 may, if desired, be cast integral with the knee. The inner end of shaft 30 carries a beveled pinion gear 32 suitably fixed on the shaft for rotation therewith. The pinion 32 engages and is in mesh with the bevel gear 27 on the elevating screw 24. The horizontal angularly disposed tubular housing 31 is, in this instance, located at the left hand side of knee K when facing the machine, and extends a distance outwardly from the left hand side wall 20 of the knee, with the shaft 30 extended a distance outwardly beyond the casing. A suitable hand crank 33 is mounted on the outer extended end of shaft 30 for hand rotation of such shaft in either direction for rotating gear 27 and elevating screw 24 to raise or lower the knee K. A cylindrical dial member 34 carrying a suitable scale around the outer peripheral surface thereof, is mounted on shaft 31 between the hand crank 33 and the outer end of the housing 31 to enable the operator to accurately adjust the knee K to a desired selected vertically adjusted position.

A locking mechanism is also provided for securely locking the knee K in any position to which vertically adjusted. Such locking mechanism may include a rock shaft 35 disposed horizontally along the left hand side wall 20 of the knee K in position disposed below the housing 31 for the elevating screw actuating shaft 30, with a suitable hand lever 36 secured at the forward end thereof for rocking the shaft 35 to and from knee-locking position. Shaft 35 extends inwardly along the knee K to position operatively associated with a mechanism generally indicated by the reference character 37 (see Figs. 2 and 4) for actuating the adjustable guide flange or gib 22b to and from locking position engaged with the adjacent side of the slideway 23 on the column C.

The solid, unbroken top wall 21 of the knee K is formed to provide a slideway 29 disposed horizontally and longitudinally of the knee for slidably receiving and mounting the saddle S for straight line movements of the saddle in opposite directions thereon, "in" and "out" relative to the machine. In providing such guideway or slide 29 the opposite longitudinal parallel side edges 21b of the knee top wall 21 are undercut, as will be clear by reference to Fig. 4a of the drawings, to provide the slideway as of dovetail cross-section. The upper or top wall 21 connects and joins the spaced opposite vertical side walls 20 of the knee K to thus form and provide a rigid structure therewith so as to rigidly brace the opposite vertical side walls 20 of the knee K to eliminate spring or yield therein and prevent lateral distortion or flex at the saddle receiving upper end of the knee when the slideway 29 of the knee is subjected to laterally acting forces applied thereto by clamping the saddle S in adjusted position thereon. The upper or top surface 21a of the slideway 29 of the knee K, between the undercut longitudinal edges 21b, provides a flat, smooth, horizontal surface which is unbroken substantially throughout its length to thus provide a supporting surface for slidably receiving and mounting the complementary surface of the saddle S when the latter is in mounted position thereon.

The saddle S is slidably mounted and confined on the slideway 29 of the knee K for horizontal straight line movements in opposite directions therealong to selected positions of adjustment "in" and "out" relative to the machine. The saddle S, referring now to Figs. 5, 6, 8 and 9 of the drawings, comprises a body structure 40 which is provided at the lower or under side thereof with the spaced, parallel and horizontally disposed guide flanges 40a and 40b, each formed with a laterally outwardly and upwardly inclined longitudinal surface at the inner side thereof, so as to form and define a dovetail groove 40c therebetween for receiving the slideway 29 of the knee K. The under side of the upper wall across the dovetail groove 40c between flanges 40a and 40b, is formed as a flat, accurately machined horizontal surface which is adapted to be slidably supported on and engaged with the flat horizontal unbroken surface 21a of the solid top wall 21 which provides the slideway 29 at the upper side of the knee K.

One of the guide flanges 40a or 40b of the saddle S, in this example the flange 40a, is formed as a laterally adjustable gib or bar member for lateral movements to and from position clamping the guide flanges 40a and 40b to the opposite side flanges 21b, respectively, of the slideway 29 of the knee K. Any suitable manually operable actuating means is provided for adjusting the guide flange 40a to and from clamping position. For example, referring now to Figs. 8 and 9 of the drawings, such actuating mechanism includes an operating hand lever 41 by which a suitable threaded shaft 41a that is operatively associated with the flange 40a, may be rotated in one direction to force guide flange 40a into clamping position and in the opposite direction to release such flange from clamping position.

The saddle S in mounted position on the knee K is movable in either direction on and along the slideway 29 of the knee to selected positions of adjustment thereon "in" or "out" relative to the machine, through the medium of an externally threaded lead screw 42 which is mounted and supported on the knee K in horizontal position extending longitudinally of and beneath the slideway 29. The lead screw 42 is positioned on the knee with its axis disposed in the vertical plane of the longitudinal center of the knee and the slideway 29. The lead screw 42 for the saddle S is rotatably mounted and journaled at the forward end thereof in an anti-friction bearing assembly 43 mounted and supported in a generally vertically disposed forward end wall 20a of the knee K, and extends inwardly through the knee to and is threadably engaged in the internally threaded bore of a fixed nut structure 44 mounted on and carried by the saddle S.

The fixed nut structure 44 of the lead screw 42 forms a part of and is mounted and carried by a yoke or bridge member 45 which is secured in position across and bridging the dovetail groove 40c formed at the under side of the saddle S by the opposite guide flanges 40a and 40b, being attached and secured at its opposite ends to the saddle body 40 at opposite sides of the body in position below the flanges 40a and 40b by machine screws or the like 45a, as will be clear by reference to Figs. 8 and 9 of the drawings in particular.

The saddle S when in mounted position on the slideway 29 of the knee K is operatively coupled with the lead screw 42, for "in" and "out" or cross feed motioning, through the medium of the nut member 44 carried by the bridge 45 which is secured to the underside of saddle body 40 in position extending across the saddle groove 40c. The bridge member 45 is thus positioned below the top wall 21 of the knee K with nut 44 positioned centrally thereon, so as to extend across the knee between the opposite side walls 20. The opposite side walls 20 of the knee K are formed with the horizontally elongated, rectangular openings 20b therethrough which are aligned laterally or transversely of the knee, as will be clear by reference to Figs. 2 and 3 of the drawings. The yoke or bridge member 45 carried by the saddle S, and which mounts the nut member 44, extends transversely across the knee K between walls 20 thereof in position beneath the top wall 21 of the knee with the opposite ends of bridge members 45 extending outwardly through the opposite side wall openings 20b, respectively. The opposite ends of bridge member 45 are, as referred to hereinbefore, secured and attached to the undersides of the side walls of saddle body 40 at the exterior of knee K, at opposite sides of the dovetail groove 40c formed in the underside of the saddle S. Thus, the saddle S with the bridge member 45 and the nut member 44 carried thereby, are movable as a unit on and independently of the knee K, with the opposite ends of the bridge member 45 extending outwardly through and freely horizontally movable in the opposite side wall openings 20b of the knee walls 20.

The lead screw 42 is mounted and journaled in the bearing 43 in the integral upper front wall 20a of knee K and extends horizontally inwardly through and centrally of the knee beneath the solid top wall 21 thereof, to and is threaded through the fixed nut member 44 carried by and movable with the saddle unit S, as will be clear by reference to Fig. 3 of the drawings. The lead screw 42 extends forwardly and outwardly from the bearing 43, to provide an accessible end shaft portion 42a for removably mounting and receiving a manual actuating member, such as the hand wheel 46. A micrometer dial member 46a is mounted on the shaft 42a concentric therewith, between the hand wheel 46 and the end wall 20a of knee K, for rotation with the shaft for visually indicating the degree of rotation of the lead screw and the resulting distance of "in" or "out," or cross feed movement of saddle S.

Cross feed or "in" and "out," straight line movements of the saddle S on the slideway 29 of the knee K, are effected by revolving hand wheel 46 to rotate the lead screw 42 to cause such lead screw to draw the fixed nut 44 outwardly or inwardly to slide the saddle S on which said nut member is fixed in the desired outward or inward direction. The actuating or motioning forces and loads applied to the saddle S, are applied to the nut 44, which nut is located centrally of the knee K and of the saddle in axial alignment with the lead screw 42 and the front supporting bearing 43, and such forces and loads are then transmitted and distributed equally to the saddle at relatively widely spaced locations at opposite sides of the saddle provided by the points of attachment of the opposite ends of the bridge member 45 by the screws 45a to opposite sides of the saddle body 40, at points spaced equi-distant from the longitudinal center of the saddle and of the axis of the nut 44 and the lead screw 42.

The construction of the knee K provides the solid, unbroken top wall 21 which is preferably cast or formed integral with the side walls 20, rear wall 22 and front wall 20a, to form the rigid non-yielding saddle slideway 29 at the upper side of the knee. The lead screw 42 is mounted centrally of the knee K in operative engagement with the fixed nut 44 which is carried centrally of the saddle S on the bridge member 45, so that the saddle motioning forces and loads applied thereto by the lead screw 42, are equally distributed to points spaced equi-distant from opposite sides of the longitudinal center of the saddle. We have thus provided a knee and saddle construction and mounting which substantially eliminates the possibility of deflection of the slideway 29 formed by the solid, unbroken top wall 21 of the knee K, under any of the laterally acting loads which may be applied thereto in operation and use, with the result that we eliminate inaccuracies which result from even minor degrees of deflection or displacement from true position of a knee mounted saddle. By our construction we have also reduced or eliminated the application to the saddle of laterally acting forces by the saddle motioning mechanism, which tend to twist or deflect the knee structure, by mounting the lead screw of such mechanism centrally of the knee and equally distributing the saddle motioning forces to the saddle at equi-distant points at opposite sides of the longitudinal axis or center of the saddle. The construction also provides an effective protective covering to prevent damage to lead screw 42 by falling objects such as metal chips.

In accordance with a further feature, we have provided a design and construction for the fixed saddle nut 44, into which the saddle motioning lead screw 42 is threaded, by which such nut is adjustable in order to compensate for possible longitudinal or axial play which may be encountered or develop between the external threading of the lead screw 42 and the internal threading of the bore of the nut 44. We have illustrated in Figs. 6 and 7 of the drawings, one possible form of such an adjustable lead screw nut. In this form, the nut body 44a is provided with a bore therethrough having an internally threaded section 44b and an enlarged diameter unthreaded section 44c in axial alignment and continuation thereof. A sleeve member 44d has a rotatable fit in the enlarged diameter bore 44c and this sleeve member has an internally threaded bore 44e therethrough of identical diameter and threading as the diameter and internal threading of the bore 44b or nut 44, so as to form in effect a continuation of bore 44b. The sleeve member 44d is provided with a radially outwardly extended flange 44f therearound at its outer end which forms a manual adjusting head for the sleeve, and also serves to take the axial thrust of the screw, such head being also provided with suitable radially disposed ribs 44g at the outer side thereof by which the sleeve may be readily manually rotated in either direction in the bore 44c of the nut 44. An annular groove 44h is formed in and around the outer side of the sleeve 44d, and a set screw 44i (see Figs. 5 and 7) is threaded through the side wall of nut body 44a with its inner end received in the sleeve recess 44h, for releasably locking the sleeve in adjusted position.

In the operation and use of the lead screw 42 and adjustable nut 44 of this example, if any play or looseness is present or develops between the external threading of the lead screw 42 and the internal threading of the sections 44b and 44e of the nut 44, the set screw 44i may be loosened by the operator to release the internally threaded rotatable sleeve 44d from its set or adjusted position. The operator then rotates sleeve 44d in such a direction as to cause the threading of the lead screw which is engaged by the internal threading of sleeve 44d, to move the screw longitudinally in a direction to take up any looseness or play between the screw threading and the threading of nuts 44 and 44d. After the required adjustment of sleeve member 44d is effected, the set screw 44i is engaged with the inner wall of the groove 44h to lock the sleeve in its adjusted angular position. Thus, by adjusting the sleeve member 44d angularly relative to the nut 44, the portion of the screw 42 lying within the nut 44 and 44d is put in tension and all looseness or play between the screw and nut threads is eliminated. Such looseness would cause inaccuracies in the degree or extent of motion of saddle S resulting from a measured or predetermined rotation of the lead screw 42 by the hand wheel 46.

The saddle S in the example hereof, may be provided with a self-contained, built-in lubricating system for various operating points on the saddle. In this instance, referring now to Figs. 5 and 6 of the drawings, a lubricant reservoir 48 is provided within the body structure 40 of the saddle S, and a suitable filter tube or the like 48a is mounted in this reservoir and extends therefrom to an accessible location at the forward or front upper side of the saddle. A system of lubricant wicks 48b, located in suitable ducts or channels provided in the saddle body 40, leads from the reservoir 48 to the various points on the saddle to be lubricated.

The saddle S carries the work table W which is mounted on the upper side of the saddle for longitudinal motioning, that is, motioning to the right or left relative to the machine, independently of the saddle along a straight line path transversely of the saddle and at right angles to the straight line path of cross feed motioning of the saddle. The table W is bodily transversely moved with the saddle S when the latter is motioned on slideway 29 of knee K for cross feed motioning or adjustments of the work table.

In this instance, the work table W is mounted on the saddle S for longitudinal feed or adjustment by a horizontal slideway provided in and disposed transversely of the saddle body structure 48, which is slidably engaged by suitable guide flanges provided at the underside of the table W. The work table W is longitudinally motioned or adjusted by an actuating or feed mechanism of the manually operable type which includes an externally threaded lead screw 50 rotatably journaled on and carried by the work table W, in threaded association with a fixed nut structure 51 mounted on the saddle S (see Fig. 9), so that rotation of the lead screw 50 will result in longitudinal feed or motioning of the work table W on and across and independently of saddle S.

Referring now to Fig. 6 of the drawings in particular, the slide on the saddle S for the work table W may include the spaced horizontal slideways or grooves providing the opposite undercut guides 52a and 52b, disposed transversely of and across the saddle S. One of such guides of the slideway, in this instance the guide 52a, may be formed and provided by a laterally movable gib or bar for adjustment to releasably clamp an adjacent guide flange of the work table W. Such guide forming gib 52a is actuated to and from clamping position by a suitable threaded shaft 52c, rotatably mounted in the front portion of the body structure 48 of the saddle S, for rotation or rocking to and from table guide flange clamping positions by hand lever 52d mounted on the outer end of shaft 52c in an accessible location on the forward or front side of the saddle. The work table W is provided with the spaced, parallel guide flanges 53a and 53b, at the underside thereof which are received and slidably confined in the grooves of the slideway on the saddle in operable engagement with the guides 52a and 52b, respectively, of the slideway formed in the upper side of the saddle S.

The fixed nut structure 51 for threaded engagement by the lead screw 50 for longitudinally motioning the work table W, is mounted in fixed position as a unit on the saddle S with its longitudinal axis disposed horizontally in the vertical plane passing through the transverse center of the saddle S, being spaced between the guides 52a and 52b of the slideway for the work table W on the saddle. Referring now to Figs. 6 and 9 of the drawings, the nut structure or unit 51 includes a tubular casing 51i fixed on the upper side of saddle S in axial alignment with lead screw 50 which extends axially therethrough. An internally threaded sleeve is mounted in and extends through the bore of the casing 51i and consists of a movable section 51a and a fixed section 51c in axial alignment and receiving the lead screw 50 in threaded engagement therethrough.

The fixed section 51c has the outer end thereof (the right hand end when referring to Fig. 9) of enlarged diameter to provide a radially disposed abutment flange for engagement at the inner side thereof with and against the adjacent outer end of the casing 51i. This abutment flange on the fixed section 51c is provided with a slot disposed transversely of the peripheral portion thereof to receive and mount a key 51f. Such key 51f is transversely bored to receive a screw 51e therethrough for threading into a suitable bore formed in and radially of the fixed section 51c, for securely fastening the key to the nut section. The inwardly extended portion of the key 51f fits into a complementary slot 51s formed in the upper side of the casing 51i, thus securely fastening and locking the nut section 51c in position mounted in the casing 51i but fixed against rotation relative thereto.

The movable section 51a of the nut structure or unit 51 is similarly formed with the outer end thereof of enlarged diameter to provide a radially disposed abutment flange for engagement with and against the adjacent outer end of the casing 51i. When referring to Fig. 9 of the drawings, the abutment flange at the outer end of movable section 51a is located at the left hand end of the section. This abutment flange is provided with a transverse or radially disposed slot 51j in the outer side thereof, which slot receives an extended key portion 51k of an adjusting sleeve 51m. The adjusting sleeve 51m is journaled in a bore formed through the upwardly extending guide portion 51b of the saddle S located at the left hand side of the saddle when referring to Fig. 9. The adjusting sleeve 51m is positioned in guide 51b in axial alignment with the axially aligned nut sections 51a and 51c. The lead screw 50 extends freely through the bore of the adjusting sleeve 51m in non-engagement therewith, so that, the sleeve and the screw are independently rotatable relative to each other. The adjusting sleeve 51m extends outwardly beyond the outer side of the guide member 51b of saddle S, and is provided with a flat outer surface 51n by which the sleeve may be suitably engaged for adjusting rotation in the guide 51b in order to rotate the nut section 51a through the medium of the key 51k of the adjusting sleeve engaged in the slot of the abutment flange at the adjacent outer end of the movable section 51a. The adjusting sleeve 51m is provided with the radial clamping flange 51o around the outer end portion thereof adjacent the guidemember 51b, and a screw 51r is threaded into the guide member 51b and mounts a clamping washer 51p for engaging over the clamping flange 51o. The adjusting sleeve is releasably secured in any adjusted position to which rotated by tightening screw 51r to clamp washer 51p against flange 51o.

Assuming that the lead screw 50, as shown in Fig. 9 of the drawings, has a right hand thread, then by rotating the adjusting sleeve 51m in a right hand direction, the adjustable nut section 51a of unit 51 will likewise be rotated in a right hand direction, and such rotation of section 51a will tend to place that portion or length of the screw 50 extending through and between the nut sections 51a and 51c in tension, so that all looseness and play between the nut assembly or unit 51 and the lead screw 50 will be eliminated. It will be noted that the axial thrust on the lead screw in the right hand direction will be taken by the threads of the nut section 51c and will be transmitted to the casing 51i of the nut unit by the outer end abutment flange of this section 51c, while axial thrust on the lead screw in the left hand direction will be taken by the threads of the nut section 51a and will be transmitted to the casing 51i by the outer end abutment flange of section 51a. It will be obvious that if the lead screw 50 becomes heated through fast operation, or for any other reason, then such screw will normally expand axially and will thus tend to relieve the fit of the threads so as to prevent further tightening and eventual seizure of the engaged threads of the nut and lead screw.

While we have disclosed the fixed section 51c of the nut unit 51 as a separate element secured in fixed position in the casing or housing 51i, it is to be understood that if desired or found expedient, this fixed section may be formed by internally threading the bore through the casing or housing with such bore formed of a suitable diameter for engagement of the external threading of the lead screw 50 with such internal threading. Such formation of the fixed nut section is broadly exemplified by the construction and arrangement of the adjustable nut 44 for the saddle motioning lead screw 42.

The above explanation of the functioning of the adjustable nut unit 51 for the work table motioning lead screw 50, by which play between the external threading of the lead screw and the internal threading of the nut unit is taken up by adjustment of a rotatable section of the nut unit to place the lead screw under tension between the sections of the nut unit, is also explanatory of the functioning of the type of adjustable nut unit 44 for the saddle motioning lead screw 42.

The lead screw 50 for motioning the work table W, referring to Figs. 8 and 9, is mounted on and extends longitudinally across the under side of the work table W along the longitudinal center thereof and is journaled at its opposite ends in suitable anti-friction bearings 50a mounted in bearing carriers 50b bolted or otherwise secured to and in position depending from the opposite ends of the work table W. The lead screw 50 extends through the adjustable fixed nut unit 51 with its external threading in engagement and mesh with the internal threading of the fixed section 51c and the movable section 51a of the nut unit. Thus, by rotating lead screw 50 in the required direction the lead screw will be fed through the fixed nut unit 51 on the saddle S to motion the work table W to the right or to the left for longitudinal feed or adjustment of the work table. The opposite ends of the lead screw 50 are extended outwardly a distance beyond the bearing carriers 50b, respectively, to form accessible end shaft portions 50c for receiving and mounting a suitable manual operating member such as the hand wheel 50d, as shown in Figs. 8 and 9 of the drawings.

Attention is directed to the fact that we have provided anti-friction bearings 50a of the combined radial and thrust type for receiving the opposite ends of and mounting the lead screw 50 on table W, as clearly shown by Fig. 9 of the drawings. By utilizing bearings of such type on opposite ends of the lead screw, such lead screw is normally placed in tension thereby. By providing this type of bearing for supporting and rotatably mounting the opposite ends of the lead screw 50, in combination with the adjustable nut unit 51 of our invention, as hereinabove described, we have produced an organization wherein the loading on the table feeding lead screw 50 is always in tension regardless of the direction of the thrust load.

In accordance with a further feature of our invention, the hand wheel 50d is combined and forms a removable unit with a cylindrical cup-like dial member 52 provided with a suitable micrometer or the like scale 52s on and around the outer peripheral surface thereof, a suitable index line (not shown) being provided on the adjacent end structure of a bearing carrier 50b on work table W, as will be readily understood by those skilled in the art. This hand wheel and dial unit includes a cylindrical body member 52a having a reduced diameter portion forming a stub shaft 52b on which the hub 50e of the hand wheel 50d is suitably keyed. The body member 52a is formed with a cylindrical portion with slightly increased diameter relative to the stub shaft 52b, positioned adjacent the inner end of stub shaft 52b and providing an annular abutment surface therearound against which the inner end portion of hub 50e abuts. This cylindrical portion 52b of body member 52a extends and is received in a central aperture or bore formed through the end wall of dial member 52. The circular edge portion of the dial member surrounding this aperture is rotatably fitted on and against the peripheral surface of the body portion 52b. A radial flange 52g is formed on and around the body member at the inner end of the portion 52b thereof, so that the inner side of the end wall of dial member 52 seats against the outer side of flange 52g. The dial member is thus mounted and maintained in the required position concentric with the axis of hand wheel 50d and of the lead screw 50, between the inner end of hub 50e and the outer side of the body member flange 52g.

The body member 52a is formed with an axial bore therethrough which receives a bolt member 52c having an externally threaded inner end for engagement into an internally threaded bore in the outer end of a shaft portion 50c of the lead screw 50 for the purpose of mounting the unit on the lead screw shaft end. The inner side of body member 52a, referring to Fig. 9a, is provided with the radially disposed, diametrically opposite keys 52h extending outwardly therefrom and engaged in complementary grooves or recesses 50f, respectively, formed at diametrically opposite locations on the outer side of a member 50g mounted on the lead screw 50 for rotation therewith in the bearing carrier 50b. Thus, rotation of the hand wheel 50d will rotate lead screw 50, and correspondingly rotate the micrometer dial 52, through the lash free coupling between members 52a and 50g, provided by keys 52h engaged in grooves 50f. The inner end of the axial bore through the body member 52a may be, as in the example hereof, formed of enlarged diameter to receive a reduced diameter tip of an end shaft portion 50c of lead screw 50.

The dial member 52 is thus mounted in position with its micrometer scale bearing peripheral side wall disposed concentric with the axis of the body member 52a and hand wheel 50d. The dial member 52 of a hand wheel and dial unit is mounted for rotation on and independently of body member 52a, for angular adjustment about the axis of the hand wheel 50d and lead screw 50, so that, the peripheral micrometer scale on the dial member may be properly set relative to the position of the lead screw 50 and work table W, or may be adjusted to correct such relationship. For instance, in this example a thumb screw 52d is rotatably mounted extending through the end wall of dial member 52 for threaded engagement with a clamping member 52e slidably mounted in an annular groove 52f of dovetail cross section, formed in the outer side of the radially disposed flange 52g against which the inner surface of the end wall of dial member 52 engages and seats.

The annular groove 52g is concentric with the axis of body member 52a, so that, the dial member 52 when released by thumb screw 52 may be rotated on and independently of the body member to adjusted position relative thereto, and then releasably secured in such adjusted position by tightening screw 52d to tightly engage the clamping member 52e with the side walls of the groove 52g.

By providing a unit formed by the combination of a hand wheel or other manual operating member such as a hand crank or the like with a micrometer dial member, the unit may be readily mounted in position or detached from position on a shaft to be actuated. Such units may be standardized for interchangeable use on a single type of machine, or for use on a variety of types of machines so that they are interchangeable between such types. The lead screw 50 for the work table in the present example is formed to provide the opposite shaft end portions 50c, in order that a hand wheel and micrometer dial unit may be mounted and applied to either or both of said shaft ends. If but one hand wheel unit is available, it may be mounted at either end and readily removed and remounted at the opposite end to meet the needs and requirements of any particular operator or operation.

In the machine of the instant example, the hand wheel 46 and micrometer dial 46a for the lead screw 42 of the saddle motioning mechanism are of the construction and arrangement to provide a removable unit similar to that above described in connection with the hand wheel and dial unit 50d—52 for the lead screw of the work table motioning mechanism. And similarly the hand crank 33 and micrometer dial member 34 for rotating the lead screw 30 of the motioning mechanism for the knee elevating screw 24, may be of the same construction and arrangement to provide a readily removable unit, as shown in Figs. 2 and 4 of the accompanying drawings.

The bearing carriers 50b which are mounted at opposite ends of the work table W are each formed with a horizontally disposed transverse skirt or apron extending across the outer side thereof to form the guard flanges 53 (see Figs. 1 and 5 in particular) at opposite sides, respectively of the bearing 50a therein. The guard flanges 53 on each carrier 50b are disposed thereon in such position relative to the upper sides of the opposite ends of the body structure 40 of the saddle S as to cover and protect the table slide structure from entry of work chips or other foreign matter into the ends of the slideway when the work table W is at or approaching its end limits of movement in either direction to the right or to the left along its path of longitudinal feed.

It is also evident that various other forms, designs, arrangements and constructions of parts and elements, as well as combinations of parts and elements, might be resorted to without departing from the broad spirit and scope of our invention, hence we do not desire to limit our invention in all respects to the exact and specific disclosures hereof.

What we claim is:

1. In a work table organization, in combination, a knee structure including spaced side walls and a horizontal, solid and unbroken top wall integral with said side walls, said top wall being formed to provide a horizontal solid, unbroken slideway, a saddle member slidably mounted on said slideway for horizontal motioning in opposite directions along a straight line path defined by said slideway, a lead screw mounted and journaled in said knee structure extending horizontally therewithin below said solid top wall, said lead screw being positioned in the vertical plane passing through the longitudinal center of said slideway, a yoke structure mounted on and carried by said slideway extending transversely through and across said knee structure below said slideway, the opposite ends of said yoke structure extending outwardly through said spaced side walls of said knee structure and being attached to said slideway at opposite sides, respectively, of the knee structure, said opposite side walls of the knee structure being provided with openings receiving and through which said yoke structure extends for free movement therethrough as the yoke structure is moved with horizontal motioning of said saddle, and an internally threaded nut unit mounted on said yoke structure centrally thereof below said slideway in axial alignment with and threadedly receiving said lead screw.

2. In combination, a knee structure comprising spaced side walls and a top wall, said top wall being formed to provide a straight slide way at the upper side thereof, a slide member slidably mounted on said slide way and being constrained thereby to movements in either direction along a straight line path, said spaced side walls being formed with transverse, aligned openings therethrough, respectively, below said top wall, a lead screw extending through said knee structure below the top wall thereof in position with its axis parallel with the straight line path of movement of said slide member, a coupling structure carried by said slide member and being attached thereto at locations spaced outwardly from the side walls respectively, of said knee structure and being extended transversely through said aligned side wall openings and across said knee structure for movements with said slide member, and a nut unit mounted on and carried by said coupling structure within said knee structure below said slide way in threaded engagement with said lead screw.

THEODORE F. ESERKALN.
FREDDY STEINBRECKER.

REFERENCES CITED

The following references are of record in the file of this patent:

UNITED STATES PATENTS

| Number | Name | Date |
|---|---|---|
| 256,355 | Morin | Apr. 11, 1882 |
| 1,535,932 | Manning | Apr. 28, 1925 |
| 1,543,242 | Allen | June 23, 1925 |
| 1,889,653 | Gorton | Nov. 29, 1932 |
| 1,965,221 | De Haas | July 3, 1934 |
| 2,052,249 | Roehm | Aug. 25, 1936 |
| 2,198,654 | Calkins | Apr. 30, 1940 |
| 2,204,693 | Parsons | June 18, 1940 |
| 2,215,684 | Armitage | Sept. 24, 1940 |
| 2,217,938 | Armitage | Oct. 15, 1940 |
| 2,235,582 | Klema | Mar. 18, 1941 |
| 2,263,928 | Marsilius et al. | Nov. 25, 1941 |
| 2,289,874 | Curtis | July 14, 1942 |
| 2,308,688 | Hassman | Jan. 19, 1943 |
| 2,319,480 | Saving et al. | May 18, 1943 |
| 2,327,404 | Curtis | Aug. 24, 1943 |
| 2,344,529 | Armitage | Mar. 21, 1944 |
| 2,345,171 | Armitage et al. | Mar. 28, 1944 |
| 2,396,632 | Bennett et al. | Mar. 19, 1946 |